US012620040B2

(12) United States Patent　　　　　(10) Patent No.: US 12,620,040 B2

Shahbazi et al.　　　　　　　　　　　(45) Date of Patent: ***May 5, 2026

(54) VALUATION OF HOMES USING GEOGRAPHIC REGIONS OF VARYING GRANULARITY

(71) Applicant: MFTB Holdco, Inc., Seattle, WA (US)

(72) Inventors: Nima Shahbazi, Toronto (CA); Mohamed Chahhou, Fes (MA); Jordan Meyer, Cary, NC (US); Shize Su, Bellevue, WA (US)

(73) Assignee: MFTB Holdco, Inc., Seattle, WA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/398,481

(22) Filed: Dec. 28, 2023

(65) Prior Publication Data

US 2024/0127377 A1　　Apr. 18, 2024

Related U.S. Application Data

(62) Division of application No. 16/457,390, filed on Jun. 28, 2019, now Pat. No. 11,861,748.

(51) Int. Cl.
| | |
|---|---|
| *G06Q 50/16* | (2024.01) |
| *G06Q 30/0201* | (2023.01) |
| *G06Q 30/0204* | (2023.01) |

(52) U.S. Cl.
CPC ......... *G06Q 50/16* (2013.01); *G06Q 30/0205* (2013.01); *G06Q 30/0206* (2013.01)

(58) Field of Classification Search
CPC . G06Q 50/16; G06Q 30/0205; G06Q 30/0206
USPC ......................................................... 705/7.34
See application file for complete search history.

(56) References Cited

U.S. PATENT DOCUMENTS

| | | | | |
|---|---|---|---|---|
| 9,605,704 B1 * | 3/2017 | Humphries | ............ | G06Q 10/10 |
| 2018/0075327 A1 * | 3/2018 | Rubinton | .............. | G06F 3/1292 |

OTHER PUBLICATIONS

Postzen, "Geohashes and You" Jun. 5, 2015 (Year: 2015).*

* cited by examiner

*Primary Examiner* — Po Han Lee

(74) *Attorney, Agent, or Firm* — Merchant & Gould P.C.

(57) ABSTRACT

A facility for estimating a subject home's value is described. For each of one or more direct home attributes, the facility determines the value of the direct home attribute for the subject home. For each of a plurality of arbitrary geographic regions of different sizes containing the subject home, the facility determines information relating to the geographic region as a whole. The facility then subjects the determined values and information to a statistical home valuation model to obtain an estimated value of the subject home.

20 Claims, 9 Drawing Sheets

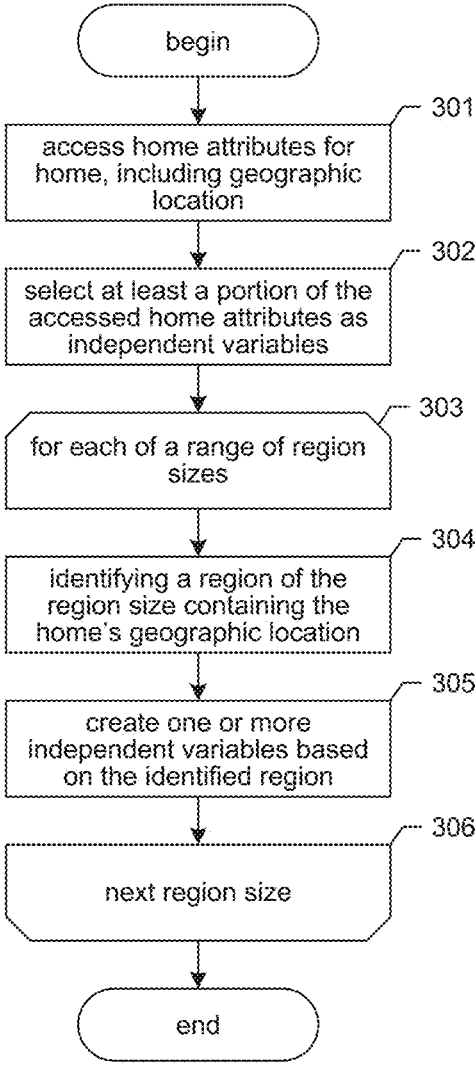

begin access home attributes for home, including geographic location ⟋ 301 select at least a portion of the accessed home attributes as independent variables ⟋ 302 for each of a range of region sizes ⟋ 303 identifying a region of the region size containing the home's geographic location ⟋ 304 create one or more independent variables based on the identified region ⟋ 305 next region size ⟋ 306 end

*FIG. 3*

400 region id independent variable table — 700

| region size | this region id | N region id | NE region id | E region id | SE region id | S region id | SW region id | W region id | NW region id |
|---|---|---|---|---|---|---|---|---|---|
| 1 | tzqv9f2 | tzqv9f8 | tzqv9f9 | tzqv9f3 | tzqv9f1 | tzqv9f0 | tzqv9dp | tzqv9dr | tzqv9dx |
| 2 | tzqv9f | tzqv9g | tzqvd5 | tzqvd4 | tzqvd1 | tzqv9c | tzqv99 | tzqv9d | tzqv9e |
| 3 | tzqv9 | tzqvc | tzqvf | tzqvd | tzqv6 | tzqv3 | tzqv2 | tzqv8 | tzqvb |
| . . . | | | | | | | | | |

701   702   703   704     790

721   722   723   724   725   726   727   728   729   730 region aggregate independent variable table — 800

890

| | region size | region id | home attribute | median across region | mean across region | variance across region |
|---|---|---|---|---|---|---|
| 801 | 1 | tzqv9f2 | sq. ft. | 1,932 | 1,910 | 23.98 |
| 802 | 1 | tzqv9f2 | tax assessment | $219,313 | $218,892 | 20.65 |
| 803 | 1 | tzqv9f2 | year built | 2012 | 2012 | 14.32 |
| 804 | 2 | tzqv9f | sq. ft. | 1,563 | 1,568 | 22.41 |
| 805 | 2 | tzqv9f | tax assessment | $188,541 | $188,574 | 20.28 |
| 806 | 2 | tzqv9f | year built | 1945 | 1943 | 15.1 |
| 807 | 3 | tzqv9 | sq. ft. | 2,265 | 2,301 | 21.52 |
| 808 | 3 | tzqv9 | tax assessment | $226,419 | $229,121 | 19.98 |
| 809 | 3 | tzqv9 | year built | 1982 | 1993 | 18.88 |
| 810 | | | | | | |
| | 821 | 822 | 823 | 824 | 825 | 826 |

VALUATION OF HOMES USING GEOGRAPHIC REGIONS OF VARYING GRANULARITY

CROSS-REFERENCE TO RELATED APPLICATIONS

This application is a division of U.S. patent application Ser. No. 16/457,390, filed on Jun. 28, 2019, entitled "VALU-ATION OF HOMES USING GEOGRAPHIC REGIONS OF VARYING GRANULARITY," the disclosure of which is incorporated herein by reference in its entirety.

This application is related to the following applications, each of which is hereby incorporated by reference in its entirety: U.S. patent application Ser. No. 11/347,000 filed on Feb. 3, 2006 (now U.S. Pat. No. 8,676,680); U.S. patent application Ser. No. 11/347,024 filed on Feb. 3, 2006 (now U.S. Pat. No. 7,970,674); U.S. patent application Ser . No. 11/524,048 filed on Sep. 19, 2006 (now U.S. Pat. No. 8,515,839); U.S. patent application Ser. No. 11/971,758 filed on Jan. 9, 2008 (now U.S. Pat. No. 8,140,421); U.S. patent application Ser. No. 13/044,480 filed on Mar. 9, 2011; U.S. Provisional Patent Application No. 61/706,241 filed on Sep. 27, 2012; U.S. patent application Ser. No. 15/715,098 filed on Sep. 25, 2017; U.S. Provisional Patent Application No. 61/761, 153 filed on Feb. 5, 2013; U.S. patent application Ser. No. 14/640,860 filed on Mar. 6, 2015; U.S. Provisional Patent Application No. 61/939,268 filed on Feb. 13, 2014; U.S. patent application Ser. No. 15/439,388 filed on Feb. 22, 2017; U.S. patent application Ser. No. 11/525,114 filed on Sep. 20, 2006; U.S. patent application Ser. No. 12/924,037 filed on Sep. 16, 2010; U.S. patent application Ser. No. 13/245,584 filed on Sep. 26, 2011 (now U.S. Pat. No. 10,078,679); and U.S. patent application Ser. No. 16/178, 457 filed on Nov. 1, 2018; U.S. Provisional Patent Appli-cation No. 62/821, 159 filed on Mar. 20, 2019; and U.S. patent application Ser. No. 16/423,873 filed on May 28, 2019.

BACKGROUND

In many roles, it can be useful to be able to accurately determine the value of residential real estate properties ("homes"). As examples, by using accurate values for homes: taxing bodies can equitably set property tax levels; sellers and their agents can optimally set listing prices; buyers and their agents can determine appropriate offer amounts; insurance firms can properly value their insured assets; and mortgage companies can properly determine the value of the assets securing their loans.

A variety of conventional approaches exist for valuing houses. For a house that was very recently sold, one approach is attributing its selling price as its value.

Another widely-used conventional approach to valuing houses is appraisal, where a professional appraiser deter-mines a value for a house by comparing some of its attributes to the attributes of similar nearby homes that have recently sold ("comps"). The appraiser arrives at an appraised value by subjectively adjusting the sale prices of the comps to reflect differences between the attributes of the comps and the attributes of the house being appraised, then aggregating these adjusted sale prices, such as by determin-ing their mean.

A further widely-used conventional approach to valuing houses involves statistical modeling. For particular geo-graphic region, such as a county, home sale transactions are used together with attributes of the sold homes to train a model capable of predicting the value of an arbitrarily-selected home within the geographic region based upon its attributes. This model can then be applied to the attributes of any home in the geographic area in order to estimate the value of this home.

BRIEF DESCRIPTION OF THE DRAWINGS

FIG. 3 is a flow diagram showing a process performed by the facility in some embodiments to establish independent variables for a home.

DETAILED DESCRIPTION

Figure 1:
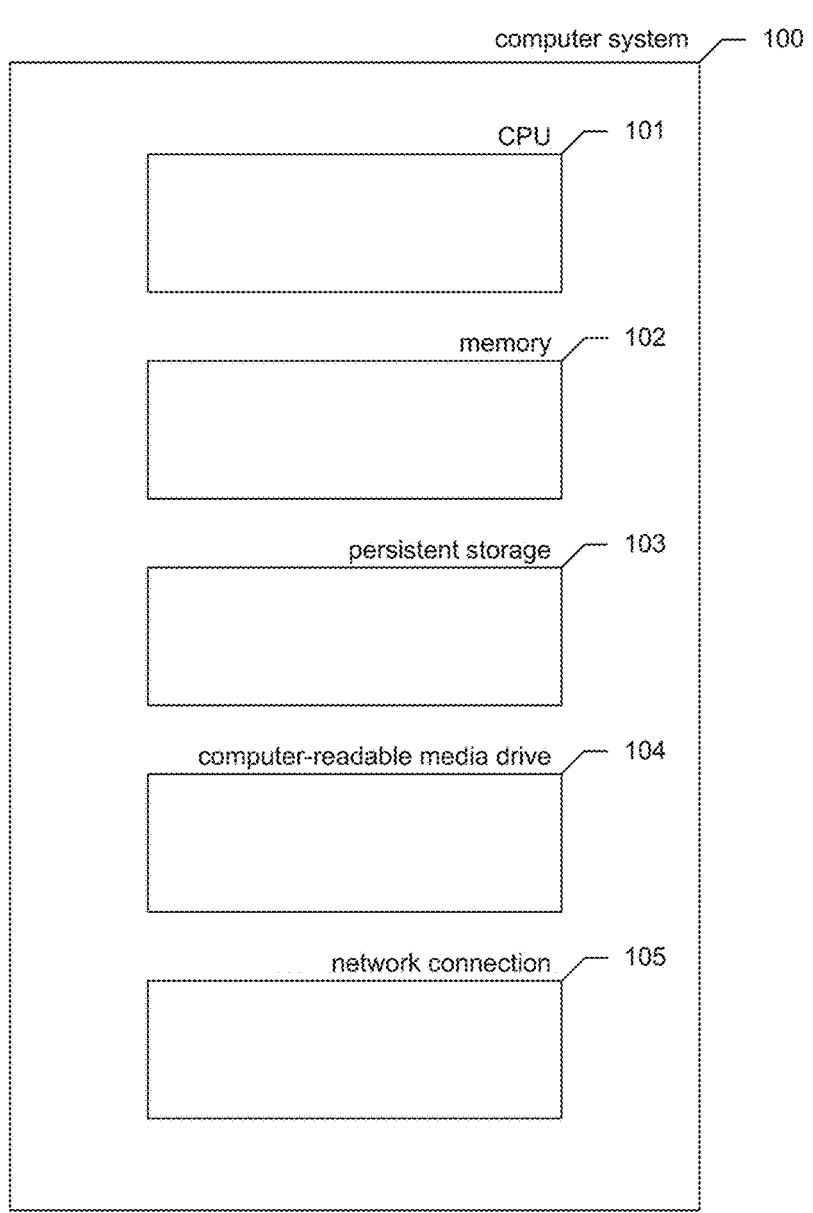
FIG. 1 is a block diagram showing some of the compo-nents typically incorporated in at least some of the computer systems and other devices on which the facility operates.

The inventors have recognized that the conventional approaches to valuing homes have significant disadvantages. For instance, attributing the most recent sale price of a home as its value has the disadvantage that the home's current value can quickly diverge from its sale price. Accordingly, the sale price approach to valuing a home tends to be accurate for only a short period after the sale occurs. For that reason, at any given time, only a small percentage of homes can be accurately valued using the sale price approach. Further, a home may be purchased by a buyer who values the home much more greatly than any other interested buyer. Because such a high-valuing buyer no longer exists in the market after the only one has purchased the home, in some or all of these cases, the sale price immediately overvalues the home.

The appraisal approach, in turn, has the disadvantage that its accuracy can be adversely affected by the subjectivity involved. Also, appraisals can be expensive, can take days or weeks to complete, and often require physical access to the home by the appraiser.

The statistical modeling approach has the disadvantage that it often fails to accurately account for valuation trends affecting regions of different sizes that contain the home.

In view of the shortcomings of conventional approaches to valuing homes discussed above, the inventors have rec-ognized that a new approach to automatically valuing homes that more accurately account for valuation trends affecting regions of various sizes that contain the home would have significant utility.

A software and/or hardware facility for automatically determining a current value for a home ("the facility") using geographic regions of varying granularity is described.

In some embodiments, the facility constructs, trains, and applies a home valuation model having independent variables that reflect an encoded version of the geographic location of the home. In some embodiments, this encoded version of location is a geohash. (See en.wikipedia.org/wiki/Geohash#Web_site_geohash.org; and geohash.org; and Sahr, Kevin, Denis White, and A. Jon Kimerling. "Geodesic discrete global grid systems." Cartography and Geographic Information Science 30.2 (2003): 121-134. for more information about geohashes, each of which is hereby incorporated by reference in its entirety.) In some embodiments, the encoded version of location used by the facility is a more traditional version of latitude and longitude. In some embodiments, a range of different granularities of encoded location are used, such as by discarding a least-significant digit (binary, decimal, or hex) or other character of each component of the encoded version to obtain each next-less-granular level of the encoded version.

In some embodiments, the model uses independent variables that specify, at each of one or more levels of granularity, the subject home's location and the eight nearest neighbors of that location at the same level of granularity. In some embodiments, the model uses independent variables that specify, at each of one or more levels of granularity, an aggregate of some home attribute across all of the homes in the same location at that granularity. For example, for a particular home, there might be independent variables whose values are obtained by (1) aggregating square footage across the 11 homes in the same location at the highest level of granularity; (2) aggregating square footage across the 88 homes in the same location at the next-lower level of granularity; (3) aggregating square footage across the 267 homes in the same location at the next-lower level of granularity; etc. In various embodiments, the facility performs these aggregations using different combinations of one or more aggregation functions, including, for example, median, mean, mode, minimum, maximum, sum, count, distinct count, range, variance, etc.

In some embodiments, the geographic regions are arranged in discrete global grid, such as a hierarchical regular or semi-regular grid, as described in en.wikipedia.org/wiki/Discrete_global_grid, which is hereby incorporated by reference in its entirety. In various embodiments, the facility uses any of the following: ISEA Discrete Global Grids; COBE—Quadrilateralized Spherical cube; Quaternary Triangular Mesh; Hierarchical Equal Area isoLatitude Pixelization; Hierarchical Triangular Mesh; S2/S2Region; S2/S2LatLng; S2/S2CellId. In various embodiments, the regions are square; non-square rectangles; regular triangles; non-regular triangles; and circles. In some embodiments, regions of adjacent sizes containing the same location are concentric, while in others, they are non-concentric. In some embodiments, the regions are defined the same for every home, such that, if two homes are in the same region, their regional independent variables have the same values at the region size of that region. In some embodiments, the regions are defined based on the location of one or more homes, such that a first home may be included in the aggregate regional independent variables for a second home, but these two homes have different sets of homes included in their regional aggregate independent variables for this region size, as each of these two homes defines a different region of this region size.

In some embodiments, regions of a certain size have the same or similar area, and/or the same or similar dimensions, and may contain numbers of homes that vary significantly. In some embodiments regions of a certain size contain the same or similar number of homes, and may have areas and/or dimensions that vary significantly.

By performing in some or all of the ways described above, the facility generates valuations for homes that are often more accurate than those generated by conventional techniques.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, DVD, or Blu-ray drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. In various embodiments, the computer systems are owned and operated by the operator of the facility; owned by the operator of the facility but operated by a third party; hardware dedicated to the operator of the facility and owned and operated by a third party; and/or owned and operated by a third party on behalf of the operator of the facility and other unrelated tenants. In various embodiments, the facility executes on these computing systems directly, and/or via one or more layers of virtualization. While computer systems configured as described above are typically used to support the operation of the facility, those skilled in the art will appreciate that the facility may be implemented using devices of various types and configurations, and having various components.

Figure 2:
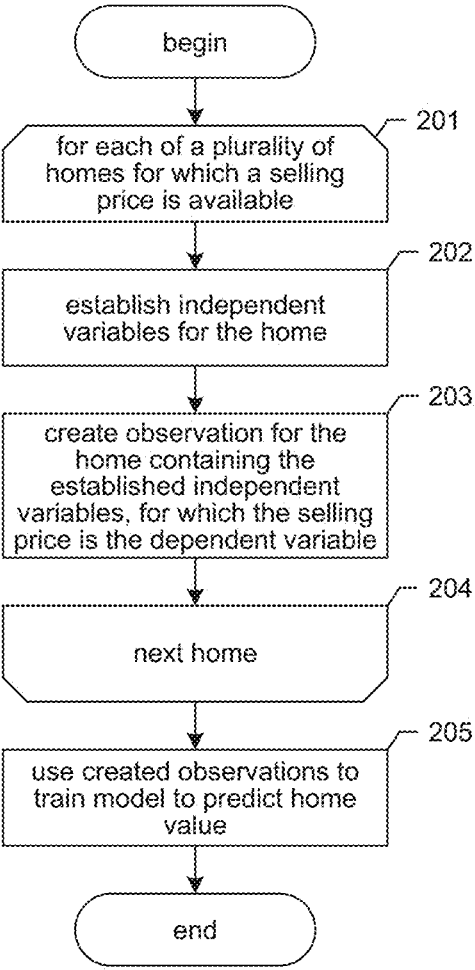
FIG. 2 is a flow diagram showing a process performed by the facility in some embodiments to establish a trained home valuation model.

FIG. 2 is a flow diagram showing a process performed by the facility in some embodiments to establish a trained home valuation model. Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

In acts 201-204, the facility loops through each of a plurality of homes for which a selling price is available. In some embodiments, these homes include those recently sold, such as those sold within the last six months, or a similar period of time. In some embodiments, these homes include homes that are the subject of synthetic sale transactions determined based on a variety of other market data. In act 202, the facility establishes independent variables for the home. Details of act 202 are shown in FIG. 3.

FIG. 3 is a flow diagram showing a process performed by the facility in some embodiments to establish independent variables for a home. In act 301, a facility accesses home attributes for the home that include a geographic location of the home, such as a latitude/longitude ("lat/long") pair, or a geohash. In various embodiments, these attributes also include, for example, number of square feet, year constructed, roof type, view type, number of bedrooms, number of bathrooms, heating type, parking type, lot size, etc. In act 302, the facility selects at least a portion of the accessed home attributes as independent variables. In acts 303-306, the facility loops through each of a range of region sizes. Table 1 below shows some of the region sizes used by the facility in some embodiments.

TABLE 1

| region size | geohash encoding level | typical number of homes |
|---|---|---|
| 1 | 7 | 12 |
| 2 | 6 | 144 |
| 3 | 5 | 2,613 |
| 4 | 4 | 25,563 |
| 5 | 3 | 92,957 |

For example, in some embodiments, the facility may in act 303 use a range of region sizes from 1-4. These are defined using geohash encoding levels between 7 and 4, and produce regions whose typical number of homes range from 12 for region size 1 to 25,563 for region size 4.

In act 304, the facility identifies a region of the present region size that contains the home's geographic location accessed in act 301. In some embodiments, the facility does this for region size 1 by calculating a level-7 geohash using the home's latitude/longitude pair. For example, for a home at latitude 41.7611 and longitude 88.3198, the facility calculates the tzqv9f2 as the geohash region id of the size-1 region containing the home's geographic location. For subsequent, larger region sizes, the facility begins with the geohash for the next-smaller region size, and removes the least significant character from the right end of this geohash. Compare the geohash region ids for regions 415, 410, and 520 shown below in Table 1 for a particular example. In some embodiments, rather than representing the region ids of regions as geohashes, the facility represents them as latitude/longitude pairs. In the above example, the facility would determine the size-1 region as (41.7611, 88.3198), i.e., the rectangle bounded by the points (41.76110, 88.31980) and (41.76119, 88.31989); determine the size-2 region as (41.761, 88.319), i.e., the rectangle bounded by the points (41.7610, 88.3190) and (41.7619, 88.3199); etc.

Figure 4:
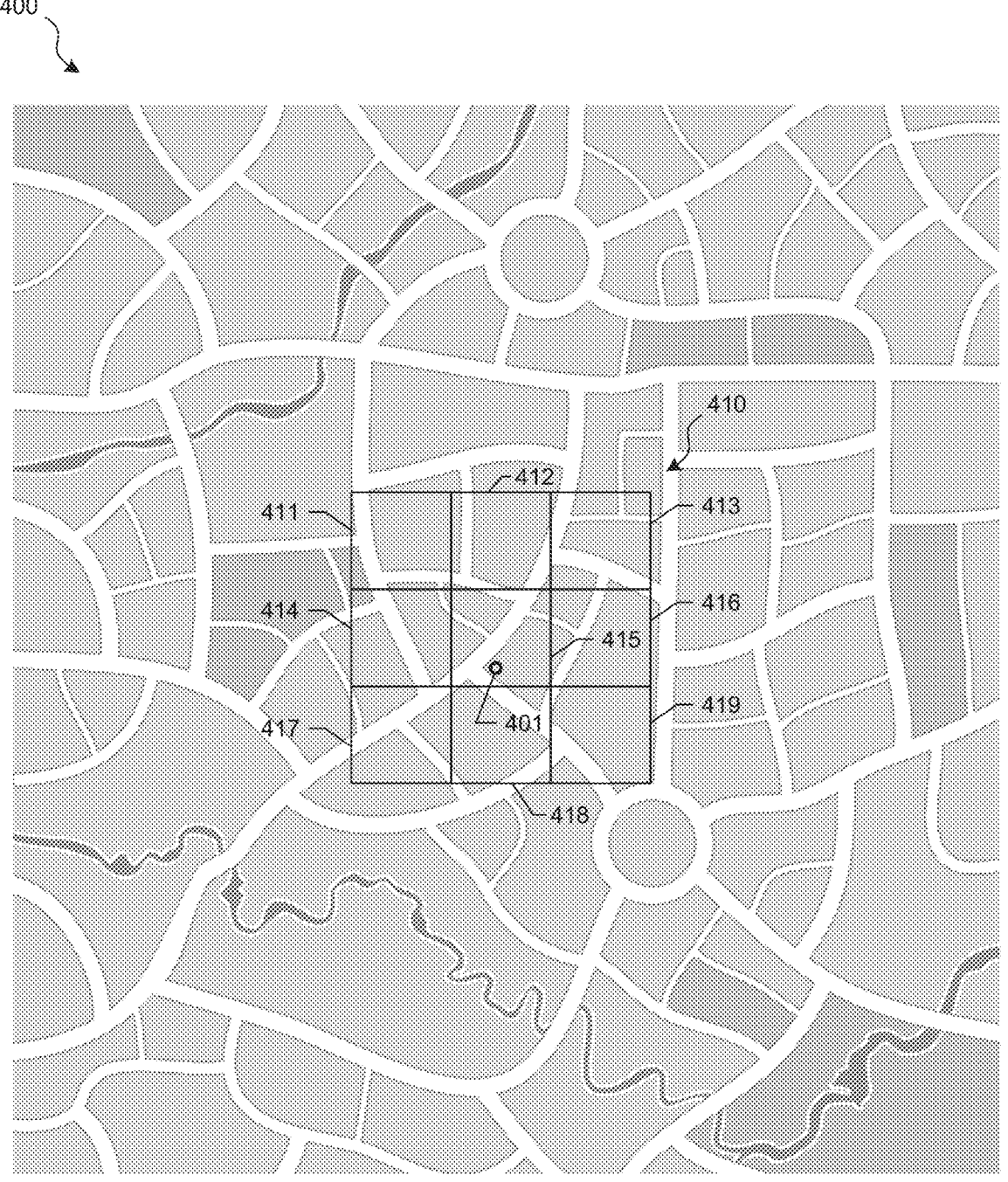
FIG. 4 is a map diagram showing an example of identi-fying a region containing the home's geographic location.

FIG. 4 is a map diagram showing an example of identifying a region containing the home's geographic location in accordance with step 304. In the map 400, a home is located at geographic location 401. In act 304, the facility identifies region 415 as a region of region size 1 that contains the home. In a subsequent iteration of the loop between acts 303 and 306 for the next-larger region size, the facility identifies region 410 as a region of region size 2 that contains the home.

Figure 5:
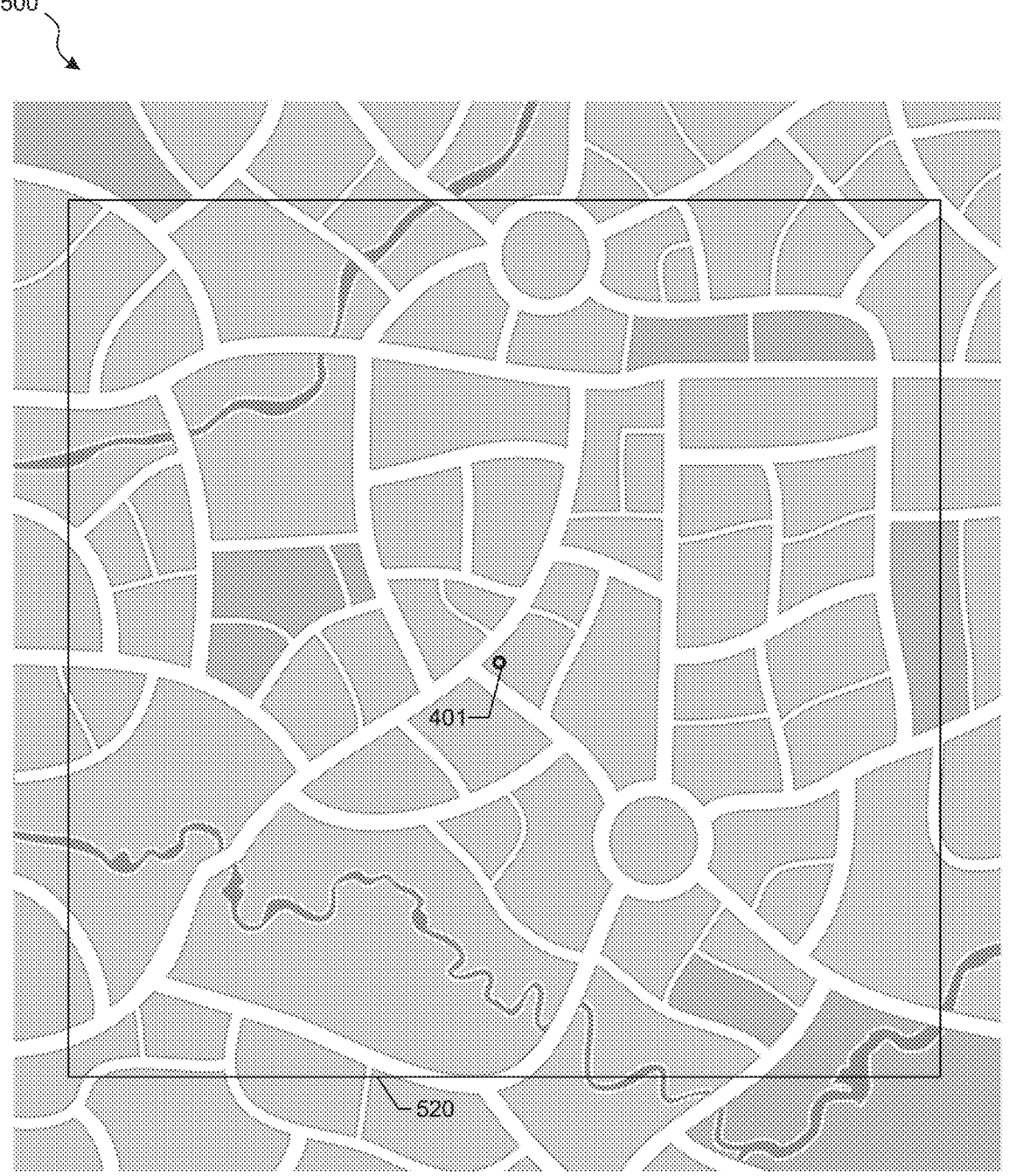
FIG. 5 is a map diagram showing a region of a larger region size identified by the facility.

FIG. 5 is a map diagram showing a region of a larger region size identified by the facility. In map 500, the facility identifies region 520 as a region of region size 3 that contains the geographic location 401 of the home.

Returning to FIG. 3, in act 305, the facility creates one or more independent variables based on the region identified in act 304.

Figure 6:
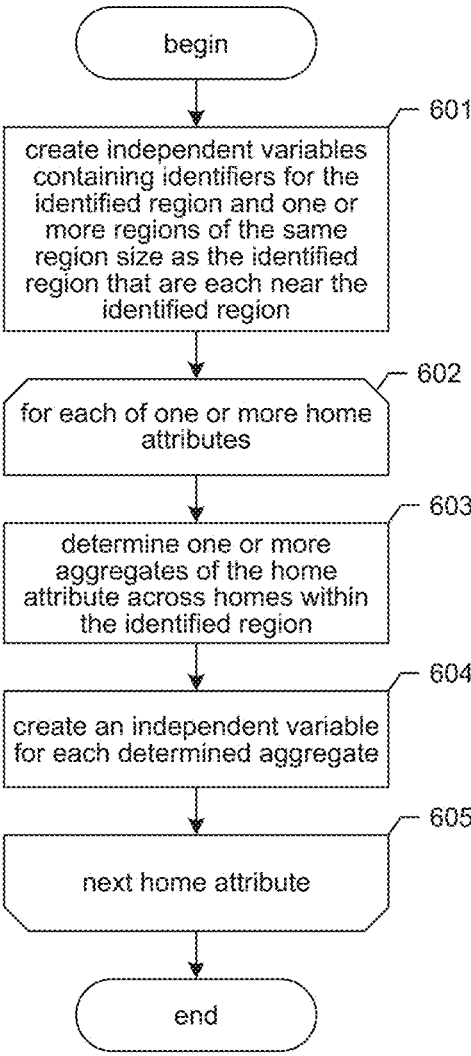
FIG. 6 is a flow diagram showing a process performed by the facility in some embodiments to create one or more independent variables based on an identified region.

FIG. 6 is a flow diagram showing a process performed by the facility in some embodiments to create one or more independent variables based on an identified region in accordance with act 305. In act 601, the facility creates one or more independent variables that contain identifiers for the identified region and one or more regions of the same region size that are near the identified region. For example, with reference to FIG. 4, where the identified region is region 415, in some embodiments, the facility creates an independent variable for each of regions 411-419. The geohash encoding of these listed regions, as well as the other regions shown in FIGS. 4 and 5, appear below in Table 2.

TABLE 2

| region size | region | geohash region id |
|---|---|---|
| 1 | 411 | tzqv9dx |
| 1 | 412 | tzqv9f8 |
| 1 | 413 | tzqv9f9 |
| 1 | 414 | tzqv9dr |
| 1 | 415 | tzqv9f2 |
| 1 | 416 | tzqv9f3 |
| 1 | 417 | tzqv9dp |
| 1 | 418 | tzqv9f0 |
| 1 | 419 | tzqv9f1 |
| 2 | 410 | tzqv9f |
| 3 | 520 | tzqv9 |

Figure 7:
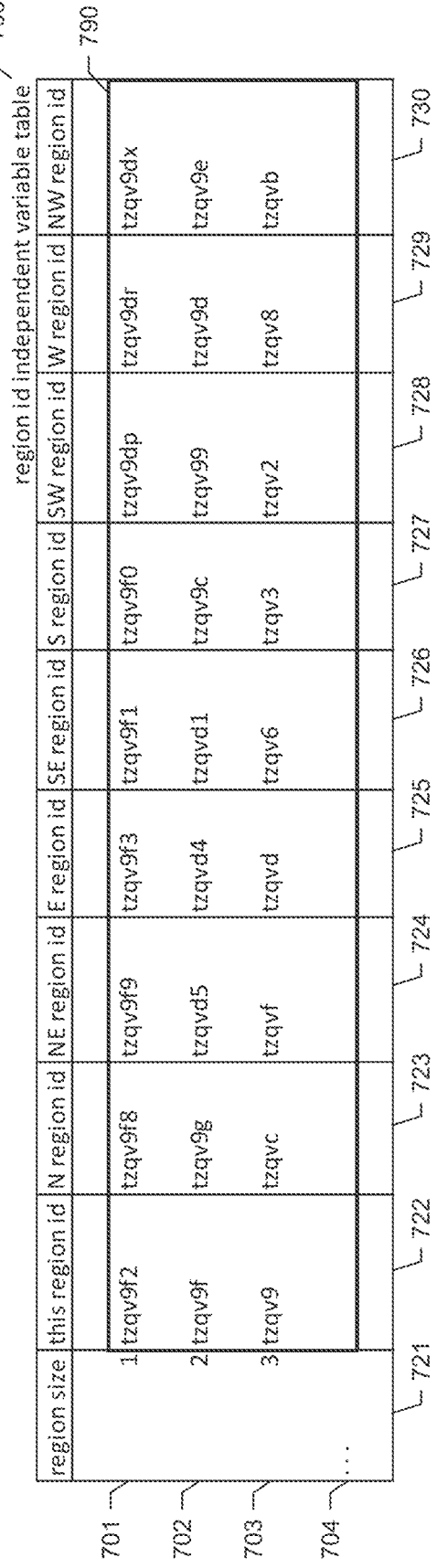
FIG. 7 is a table diagram showing sample contents of a region id independent variable table in which the facility in some embodiments stores independent variables it creates for a particular home containing region identifiers.

FIG. 7 is a table diagram showing sample contents of a region id independent variable table in which the facility in some embodiments stores independent variables it creates for a particular home containing region identifiers. Here, the home for which the contents of the region id independent variable table are shown is the one at geographic location 401. The region id independent variable table 700 is made up of rows, such as rows 701-704, each of which contains independent variables created for this home containing region identifiers for regions of a different region size. Each row is made up of the following columns: a region size column 721 containing the region size to which the row corresponds; and region id columns 722-730, each of which contains a geohash encoding region id for a region of the size to which the row corresponds for which an independent variable is created for the home in question. In particular, column 722 contains the region id for the region of the size to which the row corresponds that contains the home, while columns 723-730 contain region ids for the eight surrounding regions of the same size. For example, in row 701, corresponding to region size 1, one of the created independent variables, contained by column 722, is the region id of region 415, which is of region size 1 and contains the geographic location of the home, "tzqv9f2". In the same row, column 723 contains the region of size 1 directly to the north of the region containing the home's geographic location, region 412 shown in FIG. 4, "tzqv9f8". Box 790 shown in FIG. 7 identifies the independent variables created by the facility in act 601 in this example.

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Returning to FIG. 6, in acts 602-605, the facility loops through each of one or more home attributes to be aggregated across regions of different sizes that contain the home's geographic location. In one example, in act 602, the facility loops through the following home attributes: square feet, tax assessment, and year built. In act 603, the facility determines one or more aggregates of the current home attribute across all of the homes within the identified region. In act 604, the facility creates an independent variable for each aggregate determined in act 603.

In act 605, if additional home attributes remain to be processed, then the facility continues in act 602 to process the next home attribute, else this process concludes.

Figure 8:
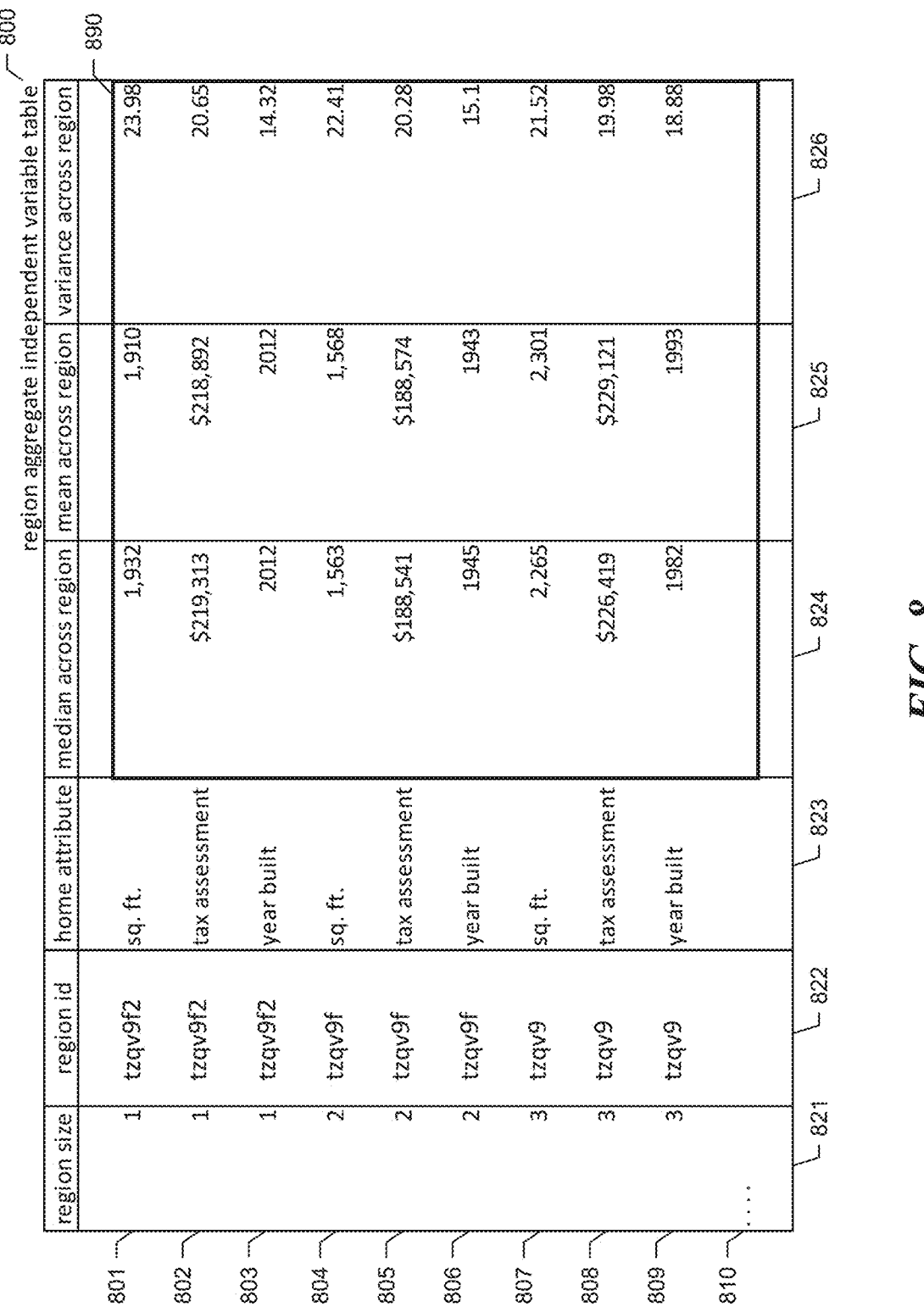
FIG. 8 is a table diagram showing sample contents of a region aggregate independent variable table used by the facility in some embodiments to store region aggregate independent variables created by the facility for a particular home.

FIG. 8 is a table diagram showing sample contents of a region aggregate independent variable table used by the facility in some embodiments to store region aggregate independent variables created by the facility for a particular home in act 604. The region aggregate independent variable table 800 is made up of rows, such as rows 801-810, each of which corresponds to a different combination of region size and home attribute. Rows 801-803 correspond to combinations of the region size 1 with each of three sample home attributes: square feet, tax assessment, and year built. Similarly, rows 804-806 correspond to combinations of the region size 2 with those same home attributes. In columns 824-826, each row contains three region aggregates determined for the particular combination of region size and home attribute to which the row corresponds. For example, row 801 contains in column 824 the value 1,932, obtained by determining the median of the square feet home attribute values of all of the homes in the region having region id tzqv9f2. Similarly, in column 825, row 801 contains the value 1,910, obtained by determining the arithmetic mean of those same square feet home attribute values for the homes in the region having region id tzqv9f2. Likewise, in column 826, row 801 contains the value 23.98, determined by calculating the variance among all of these same square feet home attribute values. In some embodiments, the facility creates all of the region aggregate independent variables shown in box 890 across three iterations of act 604 in the loop between acts 602 and 605. In some embodiments, the facility caches the aggregate values for each region to permit their reuse for other homes contained in these regions.

Returning to FIG. 3, in act 306, having created all of the region-based independent variables for a particular region size in act 305, in act 306, if additional region sizes remain to be processed, then the facility continues in act 303 to process the next region size, else this process concludes.

Returning to FIG. 2, after establishing independent variables for the current home in act 202, in act 203, the facility creates an observation for the current home. The created observation contains the independent variables established in act 202 and has the current home's selling price as the observation's dependent variable. In act 204, if additional homes remain to be processed, then the facility continues in act 201 to process the next home in the plurality of homes, else the facility continues in act 205. In act 205, the facility trains a model to predict home value using the observations created in act 203. In various monuments, the facility trains a valuation model of a variety of types, including, for example, random forests of partitioning decision trees; gradient boosting machines; other kinds of tree-based models; support vector machines, linear regressions, neural networks; other general machine learning models, or ensembles combining two or more of the foregoing model types. After act 205, this process concludes.

Figure 9:
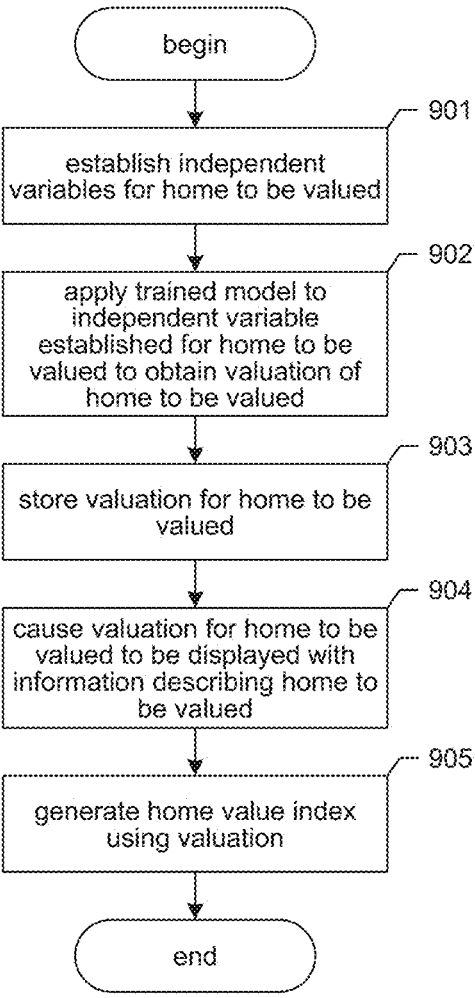
FIG. 9 is a flow diagram showing a process performed by the facility in some embodiments to estimate the value of a home using the model trained by the facility.

FIG. 9 is a flow diagram showing a process performed by the facility in some embodiments to estimate the value of a home using the model trained by the facility. In act 901, the facility establishes independent variables for the home to be valued, such as as shown in FIG. 3 and discussed above. In act 902, the facility applies the model trained in act 205 to the independent variables established for the home to be valued in act 901, in order to obtain a valuation for this home. In act 903, the facility persistently stores the valuation for the home to be valued obtained in act 902. In act 904, the facility causes the obtained valuation to be displayed along with information identifying and/or describing this home. In act 905, the facility generates or updates a home value index using home valuations that include the one obtained in act 902. After act 905, this process concludes.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for using one or more machine learning models to estimate a value of a subject home, comprising:

automatically generating, for each region corresponding to each of a plurality of region sizes and based on a latitude/longitude pair associated with the subject home, a single computer-readable geohash encoding value, wherein the single computer-readable geohash encoding value of a first region size is generated by discarding a least significant digit of the geohash encoding value of a second region size, the first region size being at a next-less-granular level than the second region size;

creating a training set comprising data of sale transactions of a plurality of homes selected from homes in two or more region sizes;

periodically training the one or more machine learning models using the created training set, wherein the one or more machine learning models comprises at least one of: a gradient boosting machine, a support vector machine, or a neural network;

determining, based on the single computer-readable geohash encoding value, values of one or more independent variables of the one or more machine learning models associated with the subject home; and applying the one or more machine learning models to the values of the one or more independent variables to produce an estimate of the value of the subject home, and wherein, for each of the plurality of region sizes, independent variables of the one or more machine learning models comprise:

an independent variable identifying a region of a region size containing the subject home, one or more independent variables each identifying a neighboring region of the region size that borders the region of the region size containing the subject home, wherein, for a respective region size, the region containing the subject home is non-overlapping with the neighboring region, and one or more independent variables each determined from an aggregation of values of a home attribute across all homes, in the region of the region size containing the subject home, for which a value of the home attribute is available.

2. The method of claim 1, further comprising:

measuring a difference between theestimate of the value of the subject home and a selling price of the subject home.

3. The method of claim 1, wherein the two or more region sizes are of different sizes.

4. The method of claim 1, further comprising, for each region, defining the region to include an area specified for the region size of the region.

5. The method of claim 1, further comprising, for each region, defining the region to include an area within a percentage of a target area specified for the region size of the region.

6. The method of claim 1, further comprising, for each region, defining the region to include a number of homes specified for the region size of the region.

7. The method of claim 1, further comprising, for each region, defining the region to include a percentage of a number of homes specified for the region size of the region.

8. The method of claim 1, wherein the aggregation of the values of the home attribute comprises computing at least one of: a median, a mean, or a variance of the values of the home attribute across the homes in the region.

9. A computer-readable non-transitory medium havinginstructions that cause a computer to perform a method for using one or more machine learning models to estimate a value of a subject home, the method comprising:

automatically generating, for each region corresponding to each of a plurality of region sizes and based on a latitude/longitude pair associated with the subject home, a single computer-readable geohash encoding value, wherein the single computer-readable geohash encoding value of a first region size is generated by discarding a least significant digit of the single computer-readable geohash encoding value of a second region size, the first region size being at a next-less-granular level than the second region size;

creating a training set comprising data of sale transactions of a plurality of homes selected from homes in two or more region sizes;

periodically training the one or more machine learning models using the created training set, wherein the one or more machine learning models comprises at least one of: a gradient boosting machine, a support vector machine, or a neural network;

determining, based on the single computer-readable geohash encoding value, values of one or more independent variables of the one or more machine learning models associated with the subject home; and applying the one or more machine learning models to the values of the one or more independent variables to produce an estimate of the value of the subject home, and wherein, for each of the plurality of region sizes, independent variables of the one or more machine learning models comprise:

an independent variable identifying a region of a region size containing the subject home, one or more independent variables each identifying a neighboring region of the region size that borders the region of the region size containing the subject home, wherein, for a respective region size, the region containing the subject home is non-overlapping with the neighboring region, and one or more independent variables each determined from an aggregation of values of a home attribute across all homes, in the region of the region size containing the subject home, for which a value of the home attribute is available.

10. The computer-readable non-transitory medium of claim 9, wherein the method further comprises:

measuring a difference between theestimate of the value of the subject home and a selling price of the subject home.

11. The computer-readable non-transitory medium of claim 9, wherein the two or more region sizes are of different sizes.

12. The computer-readable non-transitory medium of claim 9, further comprising, for each region, defining the region to include (a) an area specified for the region size of the region, (b) an area within a percentage of a target area specified for the region size of the region, (c) a number of homes specified for the region size of the region, or (d) a percentage of the number of homes specified for the region size of the region.

13. The computer-readable non-transitory medium of claim 9, wherein the aggregation of the values of the home attribute comprises computing at least one of: a median, a mean, or a variance of the values of the home attribute across the homes in the region.

14. An apparatus comprising a processor and a memory, the processor being configured to implement a method for using one or more machine learning models to estimate a value of a subject home, the method comprising:

automatically generating, for each region corresponding to each of a plurality of region sizes and based on a latitude/longitude pair associated with the subject home, a single computer-readable geohash encoding value, wherein the single computer-readable geohash encoding value of a first region size is generated by discarding a least significant digit of the single computer-readable geohash encoding value of a second region size, the first region size being at a next-less-granular level than the second region size;

creating a training set comprising data of sale transactions of a plurality of homes selected from homes in two or more region sizes;

periodically training the one or more machine learning models using the created training set, wherein the one or more machine learning models comprises at least one of: a gradient boosting machine, a support vector machine, or a neural network;

determining, based on the single computer-readable geohash encoding value, values of one or more independent variables of the one or more machine learning models associated with the subject home; and applying the one or more machine learning models to the values of the one or more independent variables to produce an estimate of the value of the subject home, and wherein, for each of the plurality of region sizes, independent variables of the one or more machine learning models comprise:

an independent variable identifying a region of a region size containing the subject home, one or more independent variables each identifying a neighboring region of the region size that borders the region of the region size containing the subject home, wherein, for a respective region size, the region containing the subject home is non-overlapping with the neighboring region, and one or more independent variables each determined from an aggregation of values of a home attribute across all homes, in the region of the region size containing the subject home, for which a value of the home attribute is available.

15. The apparatus of claim 14, further comprising:

measuring a difference between theestimate of the value of the subject home and a selling price of the subject home.

16. The apparatus of claim 14, wherein the two or more region sizes are of different sizes.

17. The apparatus of claim 14, further comprising, for each region, defining the region to include an area specified for the region size of the region.

18. The apparatus of claim 14, further comprising, for each region, defining the region to include an area within a percentage of a target area specified for the region size of the region.

19. The apparatus of claim 14, further comprising, for each region, defining the region to include a number of homes specified for the region size of the region or a percentage of the number of homes specified for the region size of the region.

20. The apparatus of claim 14, wherein the aggregation of the values of the home attribute comprises computing at least one of: a median, a mean, or a variance of the values of the home attribute across the homes in the region.

* * * * *